United States Patent [19]

Okada et al.

[11] Patent Number: 5,982,119
[45] Date of Patent: *Nov. 9, 1999

[54] MOTOR DRIVE APPARATUS INCLUDING BRAKING MEANS

[75] Inventors: Yasuhiro Okada; Tadashi Itami, both of Yonago, Japan

[73] Assignee: Matsushita Electric Industrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,000

[22] Filed: Jan. 2, 1997

Related U.S. Application Data

[63] Continuation of application No. 08/400,838, Mar. 8, 1995, abandoned.

[30] Foreign Application Priority Data

Mar. 9, 1994 [JP] Japan ..................................... 6-038239

[51] Int. Cl.$^6$ ....................................................... H02P 1/00
[52] U.S. Cl. ........................... 318/286; 318/370; 318/379
[58] Field of Search .................... 312/280–300, 312/362–382

[56] References Cited

U.S. PATENT DOCUMENTS

| | | | |
|---|---|---|---|
| 4,549,120 | 10/1985 | Banno et al. | 318/254 |
| 4,558,265 | 12/1985 | Hayashida et al. | 318/618 |
| 4,678,973 | 7/1987 | Elliott et al. | 318/254 |
| 4,695,782 | 9/1987 | Jatnieks | 318/748 |
| 4,864,211 | 9/1989 | Kawaguchi | 318/626 |

*Primary Examiner*—David Martin
*Attorney, Agent, or Firm*—Ratner & Prestia

[57] ABSTRACT

A motor drive apparatus used in a motor for controlling a rotor therein to rotate in regular and reverse directions includes a rotating direction detecting circuit for detecting a first direction in which rotor is rotating. A comparator compares a command signal with a reference signal to detect a second direction in which the rotor should rotate. A motor driver comprised of buffer amplifiers and power supply circuits is provided to rotate the rotor based on the command signal. A command signal generator produces a drive signal which is transferred to the power supply circuits through a switch when the first and second directions are both identical to the reverse direction.

8 Claims, 3 Drawing Sheets

MOTOR DRIVE APPARATUS INCLUDING BRAKING MEANS

This application is a continuation of application Ser. No. 08/400,838, filed Mar. 8, 1995, now abandoned.

BACKGROUND OF THE INVENTION

1. Field of the invention

The present invention relates to a motor drive apparatus for a brushless motor used to drive disk drive units wherein disk media such as optical disks and magneto optical disks are rotated for use and, more particularly, to a motor drive apparatus for stopping a DC brushless motor promptly to prevent reckless spinning in the reverse direction.

2. Description of the prior art

Recently, DC brushless motors wherein conductive phases are switched in due order by semi-conductors such as transistors in accordance with the output from a rotor position detector, for example comprised of hall effect devices, are widely used in the disk drive wherein disk media such as optical disks and magneto-optical disks are rotated.

With this type of disk drive, the rotation of a disk media must be reduced to a remarkably low speed, for example 30 rpm, or stopped completely so that the user can remove the disk media therefrom to replace it with another one. If not, the disk media may be damaged by any part of the disk drive during the removing operation by the user. Because it is necessary to reduce the period the user must wait for the disk drive to be ready for removing the disk media therein, a brake circuit for providing a torque command (FIG. 2) to the brushless motor to rotate in the reverse direction is required to brake the brushless motor. For this purpose, when the conventional DC brushless motor is used, the motor drive apparatus provides a reverse rotation torque command having a predetermined voltage to the motor for a predetermined period so that the motor spindle can stop completely.

However, fluctuating factors such as the size of media disks 8 cm or 12 cm in diameter for example, a motor torque, an electrical voltage in integrated circuits, temperature and humidity ambient to the disk drive may cause the time necessary for stopping the disk media to vary. Therefore, the user may access the disk media while the disk motor is still rotating. In this case, the disk media being in rotation may hit on a portion of the disk drive, and be damaged thereby. As the worse the case, the motor rotates in the reverse direction in a reckless manner.

SUMMARY OF THE INVENTION

The object of the present invention is therefore to provide an imaging device which solves these problems.

The present invention has been developed with a view to substantially solving the above described disadvantages and has for its essential object to provide an improved brushless motor drive apparatus.

In order to achieve the aforementioned objective, A motor drive apparatus for controlling the rotation of a rotor of a motor rotatable in either of regular and reverse directions based on a rotation command signal supplied thereto designates comprises a rotating direction detection means for detecting a first direction in which said rotor is rotating; a direction detection means for detecting a second direction designated by said rotation command signal; a rotating means for rotating said rotor based on said rotation command signal; and a driving means for driving said rotating means so as to stop said rotor when said first and second directions are both identical to said reverse direction.

BRIEF DESCRIPTION OF THE DRAWINGS

The present invention will become more fully understood from the detailed description given below and the accompanying diagrams wherein.

DESCRIPTION OF PREFERRED EMBODIMENT

Figure 1:
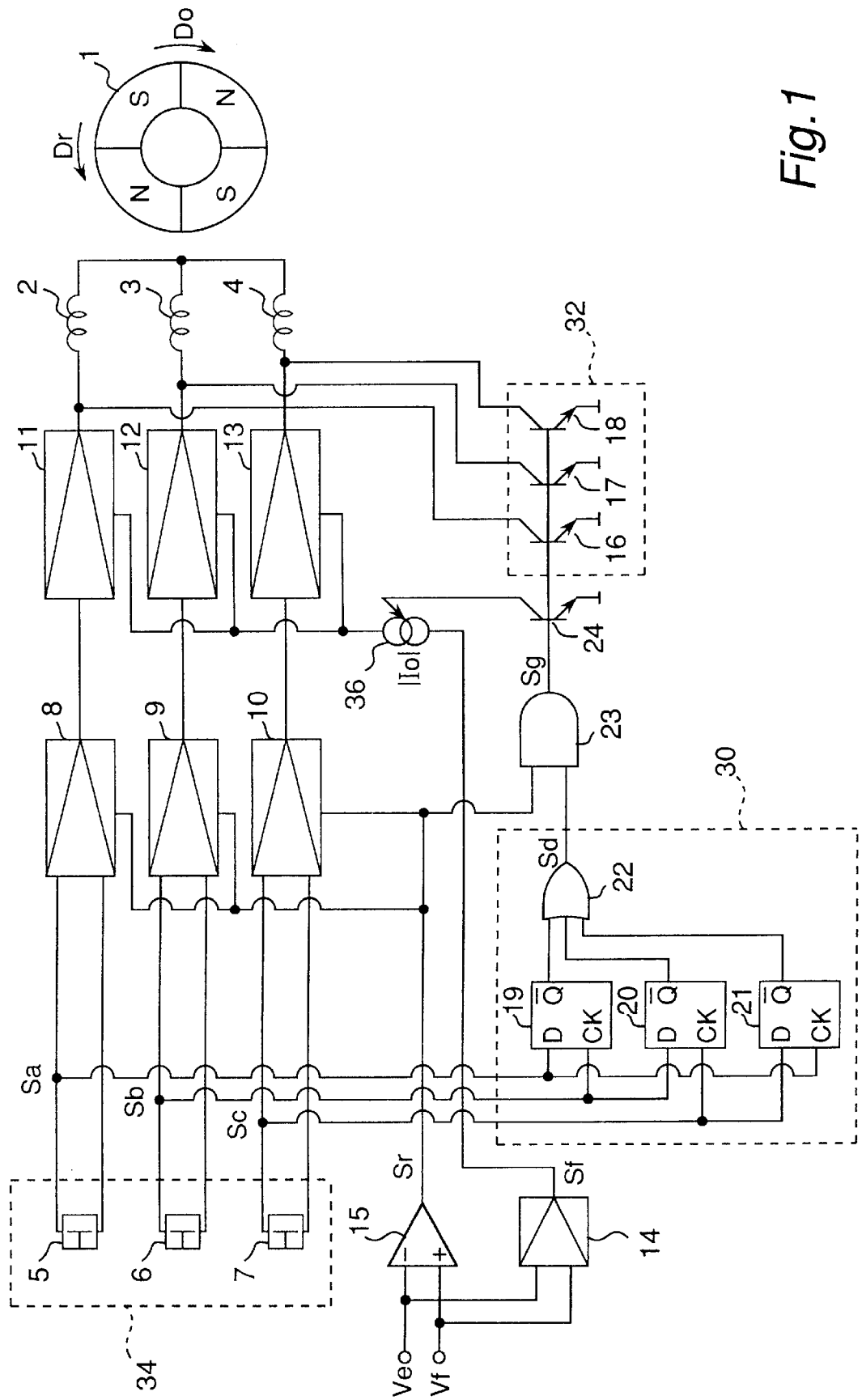
FIG. 1 is a schematic diagram of a brushless motor drive apparatus according to a preferred embodiment of the present invention.

The preferred embodiment of a brushless motor drive apparatus according to the present invention is described below with reference to FIG. 1. This brushless motor drive apparatus comprises a rotor magnet 1 rotatable in a regular direction Dr and reverse direction Do opposite to the regular direction Do. Also included in this apparatus are coils 2, 3, and 4, hall effect devices 5, 6, and 7, buffer amplifiers 8, 9, and 10, power supply circuits 11, 12, and 13, a command signal generator 14, a comparator 15, coil short transistors 16, 17, and 18, D flip-flop circuits 19, 20, and 21, an OR gate 22, an AND gate 23, a drive-off transistor 24, and a switch 36 which are connected to each other, as best shown in FIG. 1. The command signal generator 14 is constructed by absolute-value circuits. The coil short transistors 16, 17, and 18 connected to drive coils 2, 3, and 4, respectively, construct a brake circuit 32 for coil-short braking based on the signal Sg.

Figure 2:
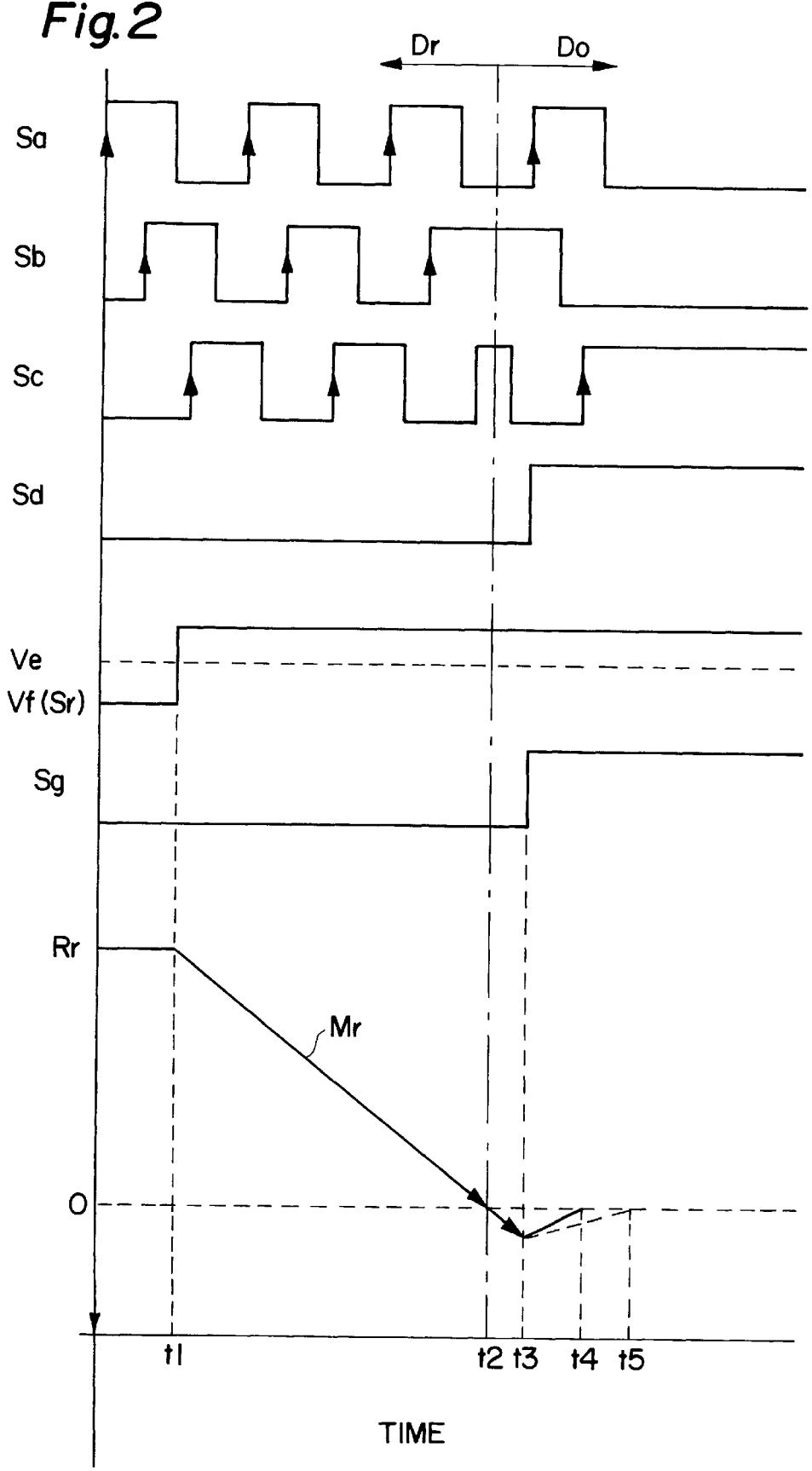
FIG. 2 is a wave form diagram of the output voltage wave obtained from the apparatus in FIG. 1.

The first hall effect device 5 detects the magnetic field produced by the rotor magnet 1, and produces a first rotor signal Sa. The first rotator signal Sa varies, as shown in FIG. 2, in accordance with the rotation of the rotor magnet 1. In this sense, the first rotor signal Sa represents the position of rotor 1 with respect to the motor. Similarly, the second and third hall effect devices 6 and 7 also produce second and third rotor signal N Sb and Sc shown in FIG. 2. The hall effect devices 5, 6, and 7 form a position detection circuit 34 that detects a rotational position of the motor with respect to the phase of rotor magnet 1.

The first rotor signal Sa thus detected is transferred to the first buffer amplifier 8 wherein the signal Sa is amplified. This amplified first rotor signal Sa is further transferred to the first power supply circuit 11 for driving the first drive coil 2. The first rotor signal Sa is also transferred to one of input terminals of the first D flip-flop circuit 19.

Similarly, the second and third rotor signals Sb and Sc are transferred to the second and third power supply circuits 12 and 13, respectively, for driving the second and third drive coils 3 and 4, respectively. The second and third rotor signals Sb and Sc are also transferred to one of input terminals of second and third D flip-flop circuits 20 and 21, respectively.

Note that the D flip-flop circuits 19, 20, 21, and the OR gate 22 form a direction detecting circuit 30. The direction detecting circuit 30 detects the direction in which the rotor magnet 1 is rotating based on the rotor signals Sa, Sb, and Sc transferred to the D flip-flop circuits 19, 20, and 21, and produces as an output a direction signal Sd indicative of the detected rotating direction from the OR gate 22.

The comparator 15 is supplied with a reference signal Ve and a command signal Vf at the input terminals thereof. The command signal Vf is indicative that the brushless motor drive apparatus should rotate the rotor 1 in the direction designated thereby, and is produced by an instrument such as a disk drive wherein the motor drive apparatus according to the present invention is used.

In this embodiment, the levels "LOW" and "HIGH" of command signal Vf command that the rotor 1 should rotate in the regular and reverse directions Dr and Do, respectively. The comparator 15 compares the command signal Vf with the reference signal Ve to detect a direction in which, regular or reverse, the rotor magnet 1 should rotate. The comparator 15 further produces a rotation signal Sr indicative of the detected direction. In this embodiment, since the command signal Vf has two levels that are greater and smaller than that of the reference signal Ve, respectively, the rotation signal Sr changes its levels "HIGH" and "LOW" in accordance with the level of the command signal Vf.

Figure 3:
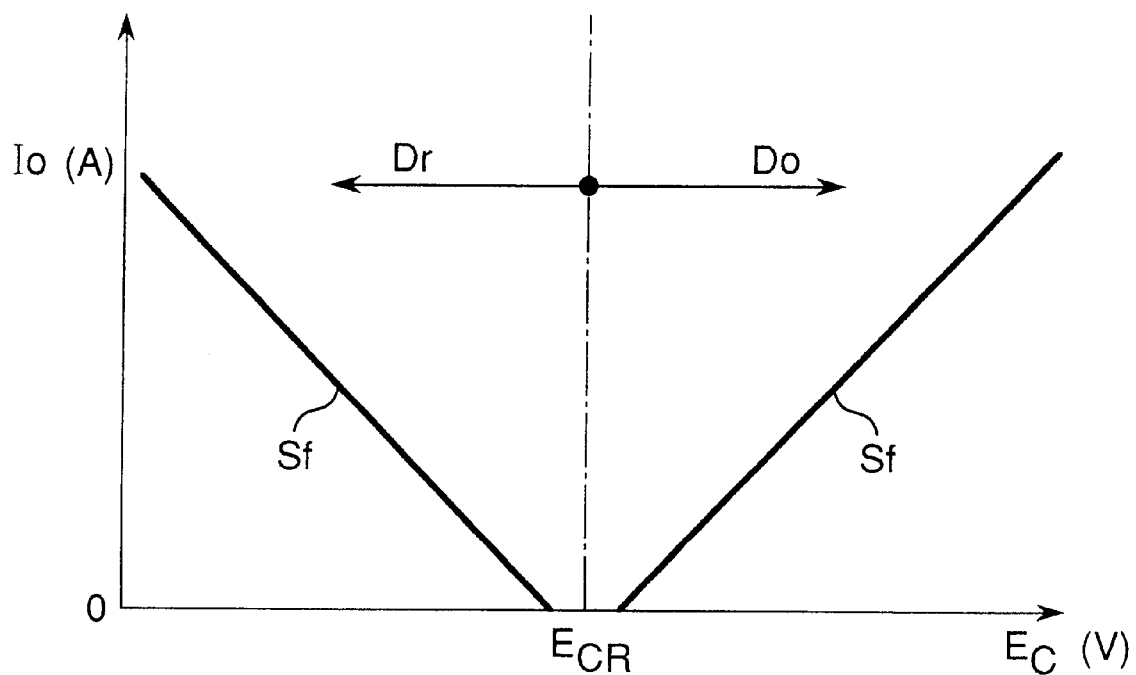
FIG. 3 is a graph showing a relationship between a torque command for an absolute-value circuit and current characteristics.

Based on these signals Ve and Vf, the generator 14 produces a drive-off signal Sf for commanding the motor to rotate the rotor 1 in the direction with the torque designated thereby. Referring to FIG. 3, an example of amplitude to voltage characteristic of the motor drive signal Sf for both the regular and reverse rotations is shown. The motor drive signal Sf is transferred to the switch 36 which operation is controlled by the drive-off transistor 24.

The direction signal Sd and the rotation signal Sr are transferred to input terminals of the AND gate 23 that produces a transistor drive signal Sg which is transferred to the drive-off transistor 24. The transistor drive signal Sg is "HIGH" only when the both signals Sr and Sd are "HIGH" meaning that the rotor 1 is rotating in the reverse direction Do and the rotation command signal Vf is indicative of the reverse rotation. Only in this case, the signal Sg makes the drive-off transistor 24 turn on. Then, the switch 36 is also turned on, and passes the drive-off signal Sf to the power amplification circuits 11, 12, and 13 so as to shut off the power supply thereto. As a result, the rotor 1 will stop.

The signal Sg output from the AND gate 23 is further transferred to the brake circuit 32 wherein the transistors 16, 17, and 18 turn on only when the signal Sg is "HIGH". Then, the brake circuit 32 performs the coil-short braking function.

With reference to FIG. 2, the operation of the brushless motor drive apparatus shown in FIG. 1, wherein a line Mr represents the rotational speed of motor rotor 1, is described herebelow. When the motor rotor 1 is rotating in the regular direction Dr at a predetermined rotational speed Rr, the position detection circuit 34 outputs three rotor signals Sa, Sb, and Sc to the D flip-flop circuits 19, 20, and 21, respectively. The phases of rotor signals Sa, Sb, and Sc are different by 120 degree to each other, and change in order of signals Sa, Sb, and Sc.

The first D flip-flop circuit 19 latches the first rotor signal Sa at a leading edge of the second rotor signal Sb. The second D flip-flop circuit 20 latches the second rotor signal Sb at a leading edge of the third rotor signal Sc. The third D flip-flop circuit 21 latches the third rotor signal Sc at a leading edge of the first rotor signal Sa. As a result, since the output $\overline{Q}$ from the D flip-flop circuits 21 are "LOW", the direction signal Sd that is the output from the OR gate 22 is also "LOW" while the motor rotates in the regular direction Dr. Therefore, the drive-off transistor 24 is kept "OFF" so that the power supply circuits 11, 12, and 13 can supply the electric power to keep the rotor 1 in rotation.

While the command signal Vf is also "LOW" indicating that the rotor 1 should rotate in regular direction Dr, the rotation signal Sr output from the comparator 15 is "LOW".

Therefore, since signals Sr and Sd input to the AND gate 23 are both "LOW", the transistor drive signal Sg of "LOW" is output to the transistor 24 therefrom. Note that the signal Sg is kept "LOW" while the signal Sd is "LOW" meaning that the rotor is rotating in the regular direction Dr.

At time t1, the command signal Vf is turned from "LOW" to "HIGH" level that is greater than the level of reference signal Ve. According to the command signal of "HIGH", the amplifiers 8, 9, and 10 drive the rotor 1 to rotate in the reverse direction Do. Accordingly, the rotor 1 is braked, and reduces the rotational speed Mr gradually, as shown in FIG. 2. Note that the signal Sg is still "LOW" regardless of the command signal Vf (HIGH) while the motor is rotating in the regular direction Dr, because the signal Sd is "LOW". Note that the drive-off signal Sf also changes its characteristics suitable for stopping the rotor in the reverse direction Do, as best shown in FIG. 3.

At time t2, however, the motor rotor 1 further reduces its rotation in the regular direction Dr and reaches a critical point between the regular and reverse rotations. Just after this critical point t2, the rotor 1 finally starts to rotate in the reverse direction Do.

At time t3, soon after time t2, the motor 1 substantially rotates in the reverse direction Do. Then, the phases of rotor signals Sa, Sb, and Sc change in order of signals Sc, Sb, and Sa, that is a reversed order in comparison with the order in regular rotation. When phase changing order varies from the regular order to the reverse order, the relationship between the D flip-flop circuits 19, 20, and 21 and the rotor signals Sa, Sb, and Sc described above is disturbed. In this embodiment, for example, the third D flip-flop circuit 21 that latches the third rotor signal Sc at the leading edge of the first rotor signal Sa is reset, as shown in FIG. 2. Then, the third D flip-flop circuit 21 outputs a "HIGH" signal, and the signal Sd of "HIGH" is output from the direction detecting circuit 30 to the AND gate 23. Thus, the AND gate 23 receives signals Sr and Sd of "HIGH", and outputs the signal Sg of "HIGH".

On receipt of this "HIGH" level signal Sg, the drive-off transistor 24 is turned on, and then the switch 36 is turned on. As a result, the drive-off signal Sf is transferred to the power supply circuits 11, 12, and 13 through the switch 36. Since the drive-off signal Sf has characteristics suitable for stopping the reverse rotation, the motor rotor 1 reduces the reverse rotation gradually and will stop at time t5.

However, on receipt of the "HIGH" level signal Sg through the transistor 24, the coil-short transistors 16, 17, and 18 are also turned on, so that the drive coils 2, 3, and 4 are driven to stop the motor rotor 1 rotation immediately. As a result, the motor reduces the reverse rotation rapidly, and stops completely at time t4 earlier than time t5.

Note that the time difference between time t2 and t3 is a time required for detecting that the motor rotor 1 changes from the regular rotation to the reverse rotation and is less than one third of one cycle period of the rotor signals Sa, Sb, and Sc regardless of the rotational position of the motor rotor 1.

With the brushless motor drive apparatus on the above mentioned state, when the torque command Vf ("LOW") for the rotation in regular direction Dr is applied thereto, the signal Sg output from the AND gate 23 immediately reverses when the signal Sr reverses. Then, the transistor 24 is turned off so that the motor rotor 1 is driven to rotate in the regular direction Dr. This function is very useful for the case that the user desires to repeat the operation for rotation and stopping of the disk drive frequently.

Additionally, due to the motor coils 2, 3, and 4 being subject to short-brake operation by the transistors 16, 17, and 18, respectively, it is difficult for the rotor 1 to rotate accidentally even when vibrations are applied to the motor from the outside. Then, the accuracy of the rotor position is secured.

As apparent from the above, according to the present invention, it is not necessary to adjust a stopping time that is suitably set for each disk media formed in different sizes. Furthermore, the motor can be stopped stably in a very short time regardless of the fluctuation of motor torque and variation of disk media size.

Furthermore, the DC brushless motor drive apparatus according to the present invention can be simply comprised of the direction detecting circuit 30 which detects the phase difference in respective magneto-electrical conversion devices for the detection of the rotating direction of DC brushless motor; the command signal generator 14 formed by the absolute-value circuits for producing a drive signal Sf to control the rotation of the motor rotor in both regular and reverse directions Dr and Do with respect to reference voltage Ve; the driving apparatus for driving the motor based on the torque command signals Vf and Sf; the comparator 15 receiving the torque command signal Vf and the reference signal Ve in input terminals thereof for detecting which directions, regular or reverse, the torque command signal Vf indicates; and stop command circuit which stops the power supply to the motor and applies the coil short braking to the motor rotor only when the reverse rotation command Vf takes place and the motor rotates in the reverse direction Do so that the motor rapidly stops securely.

Note that brushless motor drive apparatus according to the present invention is described above with reference to the embodiment wherein the three-phase motor having three-phase coils are used, however, the number of coil phases is not limited to three.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A motor drive apparatus for controlling the rotation of a rotor of a DC brushless motor rotatable in either regular and reverse directions, said apparatus comprising:

rotating direction detector for detecting a direction in which said rotor is rotating and for producing a rotating direction signal;

command generator for generating either one of a regular direction command to rotate the rotor in the regular direction, and a stop command to rotate the rotor in the reverse direction;

drive current supplier for supplying a regular drive current upon receipt of the regular direction command, and for supplying a reverse drive current upon receipt of the stop command; and a brake arrangement for causing said rotor to stop spinning by applying a braking force to said rotor when:
  a) said command generator is generating said stop command; and
  b) said rotating direction detector generates the rotating direction signal indicative of the reverse direction.

2. The motor drive apparatus according to claim 1, wherein said rotating direction detector comprises a plurality of hall effect devices for detecting respective magnetic fields produced by respective rotor magnets.

3. The motor drive apparatus according to claim 1, wherein said brake arrangement comprises switching transistors for grounding said drive current.

4. The motor drive apparatus according to claim 1, wherein said regular direction command is a LOW level signal, and said reverse direction command is a HIGH level signal.

5. The motor drive apparatus according to claim 4, wherein said rotating direction signal is a LOW level signal when the rotor is rotating in the regular direction, and HIGH level signal when the rotor is rotating in the reverse direction.

6. The motor drive apparatus according to claim 5, wherein said brake arrangement comprises an AND gate for receiving said command and said rotating direction signal.

7. The motor drive apparatus according to claim 1, wherein said brake arrangement causes said rotor to stop spinning by terminating said regular drive current.

8. The motor drive apparatus according to claim 1, wherein said brake arrangement causes said rotor to stop spinning by terminating said regular drive current by shorting a plurality of coils situated about said rotor and which receive said regular drive current.

* * * * *

UNITED STATES PATENT AND TRADEMARK OFFICE
CERTIFICATE OF CORRECTION

PATENT NO.   : 5,982,119
DATED        : November 9, 1999
INVENTOR(S)  : Okada et al.

It is certified that error appears in the above-identified patent and that said Letters Patent is hereby corrected as shown below:

<u>Title page,</u>
Under References Cited, add FOREIGN PATENT DOCUMENTS, and *add*:
2-211088       8/1990       Japan

References Cited, U.S. PATENT DOCUMENTS, make the following corrections:

| | | | | |
|---|---|---|---|---|
| *Change:* | 4,695,782 | <u>8</u>/1987 | Jatnieks | 318/748 |
| *Add:* | 4,258,299 | 3/1981 | Takeda et al. | 318/258 |
| | 4,426,606 | 1/1984 | Suita et al. | 318/375 |
| | 4,494,056 | 1/1985 | Nishijima et al. | 318/269 |

<u>Column 2,</u>
Lines 33 and 34, delete "construct" and insert -- form --.

<u>Column 4,</u>
Line 26, delete "reversed" and insert -- reverse --.

Signed and Sealed this

Fifth Day of February, 2002

*Attest:*

JAMES E. ROGAN
*Attesting Officer*   *Director of the United States Patent and Trademark Office*